US011596926B2

(12) United States Patent
Kim et al.

(10) Patent No.: US 11,596,926 B2
(45) Date of Patent: Mar. 7, 2023

(54) METHOD FOR PREPARING TERNARY ALLOY CATALYST WITH POLYDOPAMINE COATING AND TERNARY ALLOY CATALYST PREPARED THEREBY

(71) Applicant: UIF (University Industry Foundation), Yonsei University, Seoul (KR)

(72) Inventors: Han Sung Kim, Seoul (KR); Ho Jin Lee, Gwangju (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 0 days.

(21) Appl. No.: 17/410,663

(22) Filed: Aug. 24, 2021

(65) Prior Publication Data

US 2022/0062867 A1    Mar. 3, 2022

(30) Foreign Application Priority Data

Aug. 25, 2020   (KR) .................. 10-2020-0106984

(51) Int. Cl.
*B01J 23/46*    (2006.01)
*B01J 23/89*    (2006.01)
(Continued)

(52) U.S. Cl.
CPC ........... *B01J 23/462* (2013.01); *B01J 21/185* (2013.01); *B01J 23/892* (2013.01); (Continued)

(58) Field of Classification Search
CPC ...... B01J 23/462; B01J 21/185; B01J 23/892; B01J 37/0225; B01J 37/08; B01J 23/42; H01M 4/923; H01M 4/926; C22C 5/04
(Continued)

(56) References Cited

U.S. PATENT DOCUMENTS 6,517,965 B1 * 2/2003 Gorer ..................... C22C 30/00
                                                          429/339
6,723,678 B2 * 4/2004 Gorer ..................... B01J 23/40
                                                          429/526
(Continued)

FOREIGN PATENT DOCUMENTS

CN    101780414    *  7/2010  ............. Y02E 60/50
KR    10-1597970 B1    2/2016
(Continued)

OTHER PUBLICATIONS

Korean Office Action for related KR Application No. 10-2020-0106984 dated Nov. 11, 2021 from Korean Intellectual Property Office.
(Continued)

*Primary Examiner* — Patricia L. Hailey
(74) *Attorney, Agent, or Firm* — Paratus Law Group, PLLC

(57) ABSTRACT

Disclosed is a method for preparing a ternary alloy catalyst with polydopamine coating and a ternary alloy catalyst prepared thereby. The method for preparing a ternary alloy catalyst according to the present disclosure may provide a ternary alloy catalyst with increased resistance to carbon monoxide (CO) poisoning in which polydopamine is utilized as a coating material for a ternary alloy catalyst having a core-shell structure containing platinum to suppress the growth of particles during subsequent high-temperature heat treatment, and nickel (Ni), which is a transition metal, is diffused inside to form a core, thereby effectively preventing elution of nickel under an acidic condition.

9 Claims, 8 Drawing Sheets

(51) Int. Cl.
*B01J 21/18* (2006.01)
*H01M 4/92* (2006.01)
*B01J 37/08* (2006.01)
*B01J 37/02* (2006.01)

(52) U.S. Cl.
CPC ........... *B01J 37/0225* (2013.01); *B01J 37/08* (2013.01); *H01M 4/923* (2013.01); *H01M 4/926* (2013.01)

(58) Field of Classification Search
USPC .......................... 502/185, 325; 420/466, 468
See application file for complete search history.

(56) References Cited

U.S. PATENT DOCUMENTS 10,038,200 B2 * 7/2018 Kim .................... H01M 4/8825
2015/0255802 A1 * 9/2015 Kim ..................... H01M 4/926
429/524

FOREIGN PATENT DOCUMENTS

KR 10-2018-0068007 A 6/2018
KR 10-2020-0023081 A 3/2020
WO WO-0055928 A2 * 9/2000 .............. B01J 23/40

OTHER PUBLICATIONS

Yongmin Liang et al., "Synthesis and Structure-Activity Relationship Exploration of Carbon-Supported PtRuNi Nanocomposite as a CO-Tolerant Electrocatalyst for Proton Exchange Membrane Fuel Cells", J. Phys. Chem. B, Mar. 25, 2006, pp. 7828-7834, vol. 110, No. 15.

Qian-Li Zhang et al., "Facile synthesis of uniform Pt nanoparticles on polydopamine-reduced graphene oxide and their electrochemical sensing", Electrochimica Acta, 2013, pp. 1-28, vol. 112.

Yi Cheng et al., "Enhanced activity and stability of core-shell structured PtRuNix electrocatalysts for direct methanol fuel cells", International Journal of Hydrogen Energy, Nov. 21, 2015, pp. 1935-1943, vol. 41.

* cited by examiner

METHOD FOR PREPARING TERNARY ALLOY CATALYST WITH POLYDOPAMINE COATING AND TERNARY ALLOY CATALYST PREPARED THEREBY

CROSS-REFERENCE TO RELATED APPLICATION

This application claims priority under 35 U.S.C. § 119 to Korean Application No. 10-2020-0106984 (filed on Aug. 25, 2020), the entire content of which is incorporated herein by reference.

BACKGROUND

The present disclosure relates to a method for preparing a ternary alloy catalyst with polydopamine (PDA) coating and a ternary alloy catalyst prepared thereby.

A polymer electrolyte membrane fuel cell (PEMFC) has become prominent as a sustainable future clean energy device due to a high power density, high energy conversion efficiency, and a feature that carbon dioxide is not emitted. However, platinum (Pt), which is a precious metal used as a catalyst to overcome a slow reaction rate of the polymer electrolyte membrane fuel cell, is a main cause of increasing a price of a polymer electrolyte membrane fuel cell system. Therefore, studies for maximizing catalytic activity and reducing an amount of platinum have been conducted. In the polymer electrolyte membrane fuel cell, a hydrogen oxidation reaction takes place at an anode, while an oxygen reduction reaction takes place at a cathode. In general, the hydrogen oxidation reaction is faster than the oxygen reduction reaction, and thus a study for increasing a reaction rate has been mainly conducted in the cathode. On the other hand, in the anode, a small amount of carbon monoxide (CO) contained in a reformed hydrogen gas is strongly adsorbed to the platinum catalyst to cause poisoning, thereby degrading hydrogen oxidation reaction performance. In order to solve such a problem, studies on the development of an anode catalyst having resistance to the poisoning have been conducted. Among such studies, a study on a method of preparing a platinum alloy catalyst such as PtM/C (M=Ru, Fe, Mo, W) and supporting the platinum alloy catalyst on carbon in order to alleviate the poisoning of the catalyst while reducing the amount of platinum used has been conducted.

Meanwhile, in relation to a technology capable of increasing the resistance to the CO poisoning compared to single Pt and decreasing the amount of Pt used, various methods for preparing a PtRuNi ternary alloy catalyst have been studied. However, Ni species on a surface of the PtRuNi ternary alloy are easily eluted due to an acidic atmosphere of the polymer electrolyte membrane fuel cell, such that the resistance to the CO poisoning is decreased.

SUMMARY

An object of the present disclosure is to provide a method for preparing a ternary alloy catalyst that prevents nickel (Ni) from being eluted even in an acidic atmosphere when used as an anode catalyst of a fuel cell by suppressing growth of a particle size and increasing a degree of alloying in a high-temperature heat treatment process, and a ternary alloy catalyst prepared thereby and having excellent resistance to carbon monoxide (CO) poisoning and excellent catalytic properties.

In one aspect, there is provided a method for preparing a ternary alloy catalyst using polydopamine protective coating, the method including: supporting a PtRu catalyst on crystalline carbon (C); coating the surface of the supported PtRu catalyst with polydopamine (PDA); preparing a PtRuNi catalyst by supporting Ni on the coated PtRu catalyst; and performing heat treatment on the PtRuNi catalyst in a mixed gas atmosphere of hydrogen and inert gas.

In another aspect, there is provided a ternary alloy catalyst prepared according to the preparing method using polydopamine coating described above.

In another aspect, there is provided an anode active material for a fuel cell, containing the ternary alloy catalyst.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Figure 1:
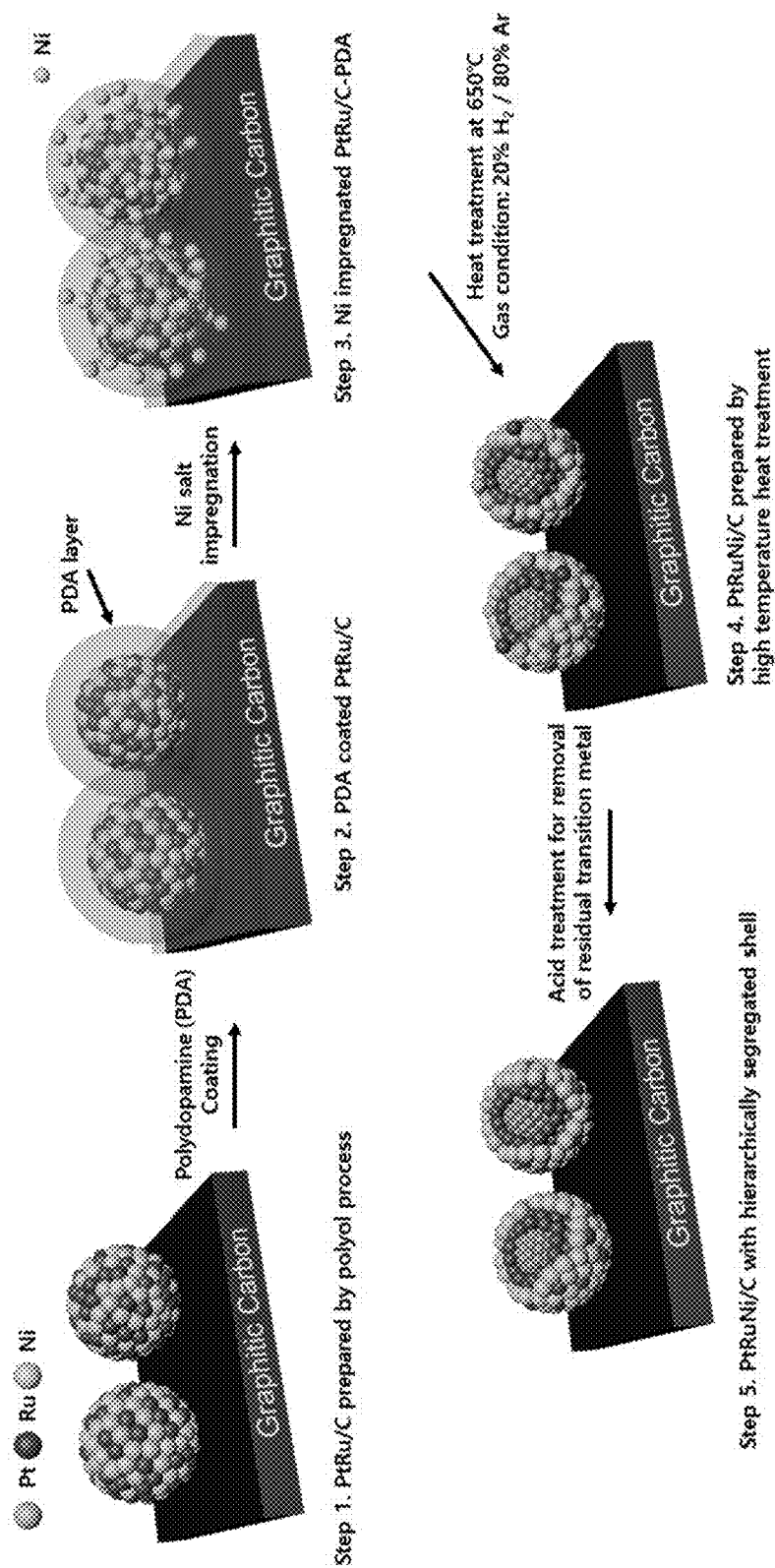
FIG. 1 is a schematic view illustrating a method for preparing a ternary alloy catalyst using polydopamine coating according to the present disclosure.

A technology to be described below may be variously modified and may have several embodiments. Therefore, specific embodiments will be illustrated in the drawings and described in detail. However, it is to be understood that the technology described below are not limited to a specific embodiment, but includes all modifications, equivalents, and substitutions without departing from the scope and spirit of the techniques described below.

In one aspect, the present disclosure provides a method for preparing a ternary alloy catalyst with polydopamine coating, the method including: supporting a PtRu catalyst on crystalline carbon (C); coating a surface of the supported PtRu catalyst with polydopamine (PDA); preparing a PtRuNi catalyst by supporting Ni on the coated PtRu catalyst; and performing heat treatment on the PtRuNi catalyst in a mixed gas atmosphere of hydrogen and inert gas.

In one specific embodiment, the crystalline carbon may be one or more selected from the group consisting of carbon black, carbon nanotubes, carbon nanofibers, carbon nanocoils, and carbon nanocages.

In another specific embodiment, the carbon may be carbon doped with 1-pyrene carboxylic acid (1-PCA).

In another specific embodiment, a molar ratio of Pt:Ru in the PtRu catalyst may be 1:0.9 to 1.1, preferably 1:0.95 to 1.05, and most preferably 1:1. In the above ranges, catalytic properties and electrochemical performance of a battery are excellent.

In another specific embodiment, a molar ratio of Pt:Ru:Ni in the PtRuNi catalyst may be 1:0.9 to 1.1:0.5 to 0.9, preferably 1:0.95 to 1.05:0.7 to 0.8, and mot preferably 1:1:0.75. The catalytic properties and the resistance to poisoning of the battery are excellent because segregation of Ru does not occur in the above range.

In another specific embodiment, the heat treatment may be performed at 600 to 700° C., preferably at 620 to 680° C., and most preferably at 650° C. The catalytic properties and the resistance to poisoning of the battery are excellent because segregation of Ru does not occur in the above range.

In another specific embodiment, a mixed atmosphere of hydrogen and inert gas may be a mixture of hydrogen:inert gas in a volume ratio of 10:30 to 50, preferably 10:35 to 45, and most preferably 10:40. In the range of the volume ratio of the gas, during the heat treatment process, the growth of the particles is suppressed and at the same time, the protective coating layer surrounding the surface of the catalyst is pyrolyzed and completely removed. As a result, an electrochemically active surface area increases, such that the performance of the catalyst becomes excellent.

In another specific embodiment, the inert gas may be argon (Ar).

In addition, in another aspect, the present disclosure provides a ternary alloy catalyst, which is prepared in the preparing method using polydopamine coating described above.

In addition, in another aspect, the present disclosure provides an anode active material for a fuel cell, containing a ternary alloy catalyst using polydopamine coating.

Hereinafter, the present disclosure will be described in more detail with reference to the accompanying drawings in order to assist in the understanding of the present disclosure. However, the following examples are provided only in order to easily understand the present disclosure, and a content of the present disclosure is not limited thereto.

Example 1: Preparation of Ternary Alloy Catalyst Using Polydopamine Coating

FIG. 1 is a schematic view illustrating a method for preparing a ternary alloy catalyst using polydopamine coating according to the present disclosure.

Platinum ruthenium (PtRu catalyst (Pt$_1$Ru$_1$-polyol)) was supported on crystalline carbon (C) using polyol and then coated using polydopamine (PDA) as a capping agent, nickel (Ni) was supported, and a precursor deposition method was applied. Then, a high-temperature heat treatment was performed to perform an alloying process.

Specifically, 50 mg of 1-pyrene carboxylic acid (1-PCA) was added to 20 mL of ethanol and stirred for 30 minutes. After 30 minutes, 100 mg of crystalline carbon was added to the 1-PCA solution and stirred for 2 hours. Crystalline carbon doped with 1-PCA was recovered from the stirred sample using a decompression filtration apparatus. This step is to form a π-π interaction between 1-PCA and crystalline carbon, and as a result, make a surface of the crystalline carbon hydrophilic to facilitate platinum support. 110 mg of crystalline carbon doped with 1-PCA was added to 25 ml of ethylene glycol, followed by ultrasonic dispersion for 30 minutes. PtCl$_4$ and RuCl$_3$ were added to the stirred solution and stirred for 30 minutes. After the stirring was completed, 85 mg of NaOH was added and stirred for 30 minutes to adjust a pH to 6 to 7. Here, NaOH contributes to lower a particle size of platinum by adjusting the pH of ethylene glycol. NaOH was completely dissolved, and then refluxed at 170° C. for 10 minutes using a microwave. At this time, platinum (Pt) and ruthenium (Ru) ions were reduced and adsorbed to the surface of crystalline carbon. Thereafter, the pH was lowered using 0.1M H$_2$SO$_4$ to adjust the pH to 2 to 3, and after the adjustment of the pH was completed, the stirring was additionally performed for 24 hours. After the stirring was completed, the solution was filtered using a decompression filtration apparatus. Then, the solution was washed three times with deionized water and dried at 80° C. for 3 hours to remove impurities and obtain PtRu supported on carbon.

In order to synthesize dopamine, a Tris-buffer solution (pH 8.5) was prepared. At this time, in order to uniformly synthesize the dopamine, the pH should be precisely adjusted. 121 mg of Tris aminomethane was added to 100 mL of deionized water and stirred for 1 hour. After the stirring was completed, 0.5 M HCl was added by 0.2 mL each time using a micropipette. A pH was measured whenever 0.5 M HCl was added by 0.2 mL in the above process. When the pH reached 8.5, the addition of HCl was stopped, followed by stirring for 2 hours. After adjusting a temperature of 38 mL of the Tris-buffered solution prepared above to 25° C., 175 mg of the prepared PtRu catalyst supported on carbon was added. After stirring this solution for 30 minutes, a solution of 120 mg of dopamine hydrochloride dissolved in 2 ml of a Tris-buffered solution was added and stirred for 24 hours. In this step, dopamine was coated on the PtRu catalyst supported on carbon. The coated sample was recovered using a decompression filtration apparatus and washed twice with deionized water. Then, after drying the sample in an oven at 80° C. for 30 minutes, a PtRu catalyst supported on polydopamine-coated crystalline carbon was recovered.

Nickel nitrate ($Ni(No_3)_2 \cdot 6H_2O$) and ethylenediamine were added to 20 ml of deionized water, sufficiently stirred, and then the prepared polydopamine-coated PtRu catalyst supported on crystalline carbon was added thereto, and refluxed at 80° C. for 3 hours. After the reflux was completed, the deionized water was evaporated using an evaporator, and the sample was recovered. The prepared catalyst was put into a furnace and heat treatment was performed at 650° C. and in an atmosphere of 80% argon and 20% of hydrogen for 1 hour. After recovering the heat-treated sample, it was acid-treated in 0.5M $H_2SO_4$ at 80° C. for 3 hours to additionally remove transition metals that does not diffuse into the interior and exists as a residue during the heat treatment process. The washing was performed twice, and a ternary PtRuNi alloy catalyst supported on crystalline carbon was recovered.

When high-temperature heat treatment was performed, PDA was decomposed by heat, while growth of platinum particles coated by PDA was suppressed. In addition, when the heat treatment was performed, the impregnated heterogeneous metal salts diffused into the platinum during the process of decomposition of the PDA to finally obtain a platinum-based PtRuNi ternary alloy catalyst in the form of a core-shell with a high platinum concentration on the surface.

Comparative Example 1

A PtRu alloy catalyst ($Pt_1Ru_1$/C-polyol) supported on crystalline carbon was prepared by a polyol reduction process.

Comparative Example 2

A catalyst was prepared in the same manner as in Example 1, except that the heat treatment process was not performed.

Comparative Example 3

A PtRuNi ternary alloy catalyst supported on crystalline carbon was prepared by supporting Ni on a PtRu catalyst supported on crystalline carbon, and performing heat treatment at 650° C. and under the conditions of 20% hydrogen and 80% argon for 1 hour in the same manner as in Example 1, without performing the polydopamine (PDA) coating process as in Example 1.

Test Example 1

In the present Test Example 1, a test was conducted to find out the effect depending on whether polydopamine (PDA) coating was performed in the preparation of the ternary alloy catalyst.

Figure 2A:
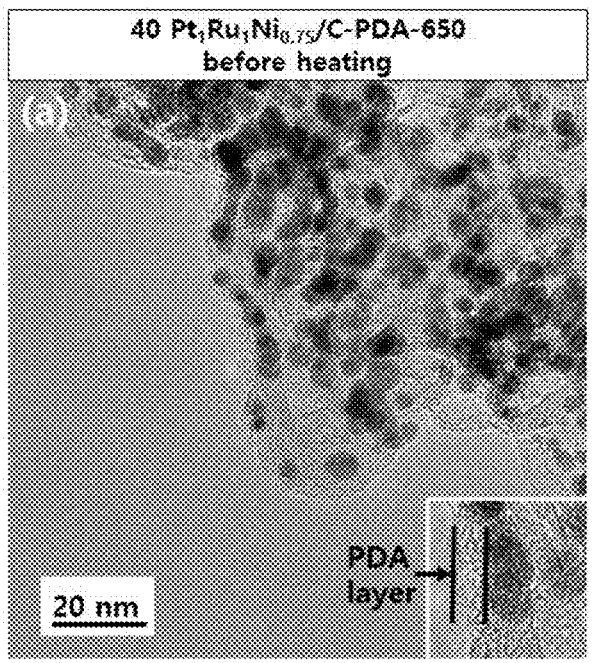
FIGS. 2A to 2D show transmission electron microscope images of the ternary alloy catalyst prepared according to the present disclosure.
Figure 2B:
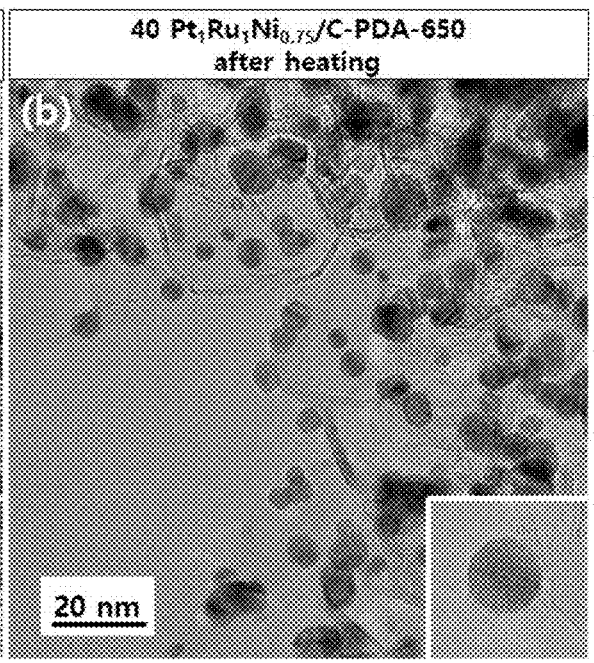
Figure 2C:
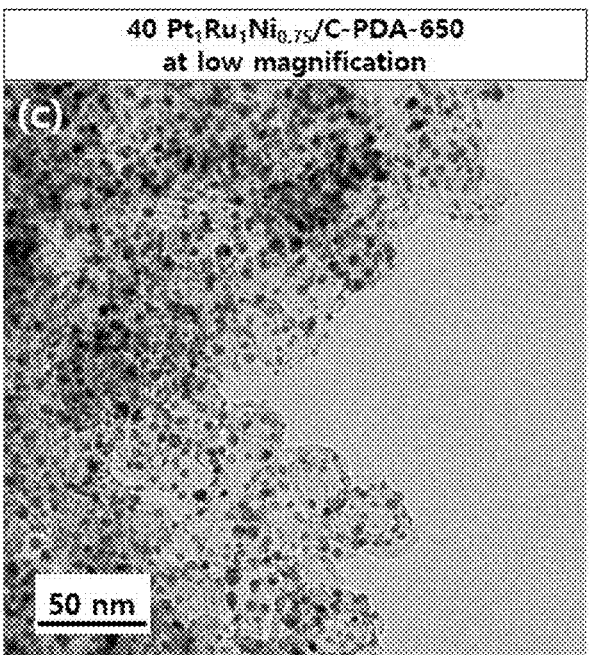
Figure 2D:
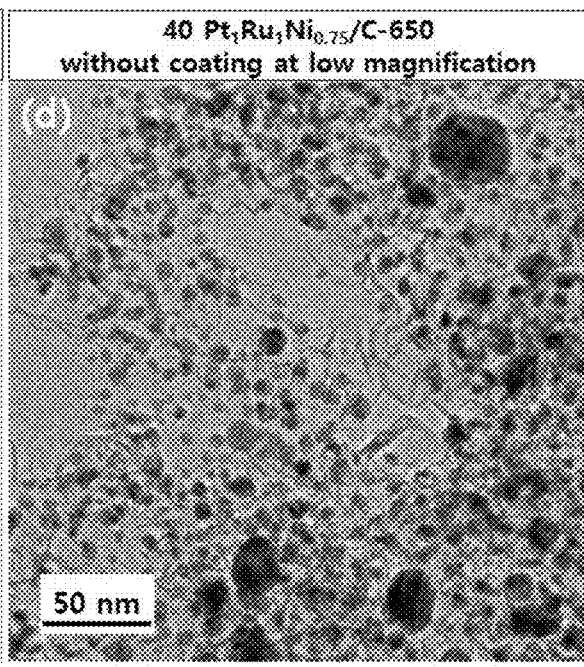

FIGS. 2A to 2D are transmission electron microscope images of the ternary alloy catalyst prepared according to the present disclosure. FIG. 2A is an image captured before heat treatment of a ternary alloy catalyst ($Pt_1Ru_1Ni_{0.75}$/C-PDA-650) on which Ni is supported on a PtRu catalyst ($Pt_1Ru_1$-polyol) coated using polydopamine (PDA) as a capping agent. FIGS. 2B and 2C are images captured respectively at high magnification and low magnification after heat treatment of the ternary alloy catalysts at 650° C. FIG. 2D is an image of a ternary alloy catalyst on which Ni is supported without polydopamine (PDA) coating and heat treatment was performed at 650° C.

First, it can be confirmed from FIG. 2A that the PDA coating is uniform. It can be confirmed from FIG. 2B that the PDA coating layer evenly surrounding the catalyst was decomposed by heat treatment. It can be confirmed from FIG. 2C, which is a low magnification image of the sample of FIG. 2B, that small alloy particles of 5 nm or less are uniformly formed while maintaining a high degree of dispersion despite high-temperature heat treatment (650° C.). On the other hand, it can be confirmed from FIG. 2D in which the PDA coating was not performed, that the alloy particles show agglomeration after heat treatment, and the particle size is increased compared to the ternary alloy catalyst sample of FIG. 2C. From the above results, it can be confirmed that the polydopamine (PDA) coating is required to prepare a small and uniform alloy catalyst.

Figure 3:
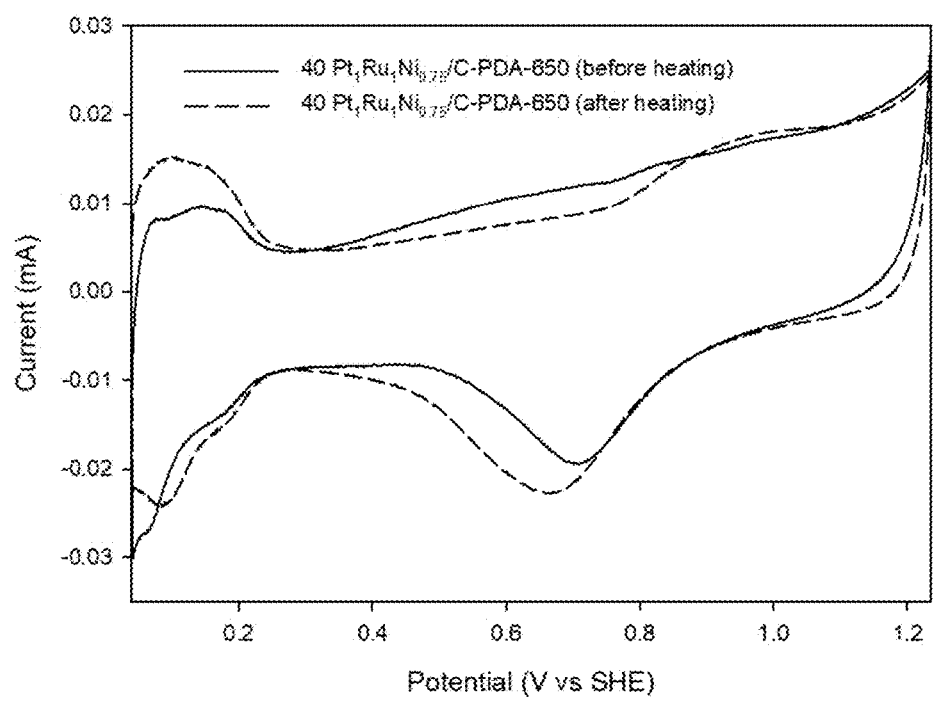
FIG. 3 shows graphs illustrating comparison results of active surface areas of the ternary alloy catalyst before and after heat treatment, after PDA coating, through cyclic voltammogram analysis.

FIG. 3 shows graphs illustrating comparison results of active surface areas of the ternary alloy catalyst before and after heat treatment, after PDA coating, through cyclic voltammogram analysis.

It can be confirmed from FIG. 3 that the electrochemically active surface area of the PDA-coated PtRuNi/C ternary alloy catalyst after heat treatment is 41.2 $m^2g^{-1}$, which is larger than that of the ternary alloy catalyst before heat treatment of 27.8 $m^2g^{-1}$. This means that the PDA coating layer that has covered the catalyst surface was removed through heat treatment in a mixed gas atmosphere of hydrogen and inert gas, such that the active surface area of the catalyst was exposed on the surface of the ternary alloy catalyst, and thus, the electrochemically active surface area was increased.

Test Example 2

Figure 4:
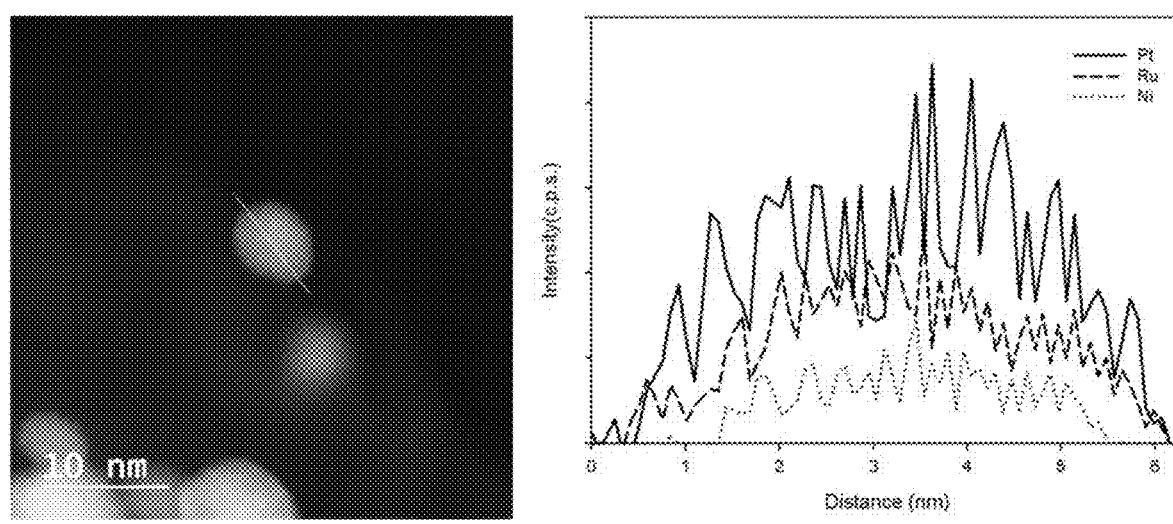
FIG. 4 shows a high angle annular dark field (HADDF) image of the ternary alloy catalyst using polydopamine coating prepared according to the present disclosure and graphs illustrating concentration distributions of platinum (Pt), ruthenium (Ru), and nickel (Ni) at a cutting line on the image.

FIG. 4 shows a high angle annular dark field (HADDF) image of the ternary alloy catalyst using polydopamine coating prepared according to the present disclosure and graphs illustrating concentration distributions of platinum (Pt), ruthenium (Ru), and nickel (Ni) at a cutting line on the image.

It can be confirmed from FIG. 4 that Ni is hardly present on the surface of the ternary alloy catalyst particles, and only Pt and Ru are present. From this result, it can be confirmed that a structure in which Ni is concentrated into the core of the ternary alloy catalyst was formed due to surface segregation caused by heat treatment.

Test Example 3

In the present Test Example 3, a test was conducted to determine whether nickel (Ni) has leached depending on whether polydopamine (PDA) coating was performed in the preparation of the ternary alloy catalyst.

An inductively coupled plasma (ICP) analysis and an X-ray photoelectron spectroscopy (XPS) analysis were performed on a ternary alloy catalyst (40 $Pt_1Ru_1Ni_{0.75}$/C-PDA-650° C.) using polydopamine coating prepared according to the present disclosure and a ternary alloy catalyst (40 $Pt_1Ru_1Ni_{0.75}$/C-650° C.) prepared in the same manner without performing PDA coating. The results are shown in Table 1 below. The total composition ratio of a bulk material may be measured by ICP, and the composition ratio of the surface may be confirmed by XPS.

TABLE 1

| Catalyst | Pt: Ru: Ni Ratio | | | |
|---|---|---|---|---|
| | Bulk ratio by ICP-AES before leaching | surface ratio by XPS before leaching | Bulk ratio by ICP-AES after leaching | surface ratio by XPS after leaching |
| 40 $Pt_1Ru_1Ni_{0.75}$/C-650° C. | 1:0.97: 0.734 | 1:0.67:0.7 | 1:0.882:0.28 | 1:0.595: 0.196 |
| 40 $Pt_1Ru_1Ni_{0.75}$/C-PDA-650° C. | 1:0.976: 0.722 | 1:0.656: 0.438 | 1:0.891: 0.372 | 1:0.562: 0.11 |

During the test, leaching was performed through acid treatment in order to remove Ni that was not perfectly alloyed, and each measurement was performed before and after leaching. The ICP results before leaching showed that both catalysts have a composition ratio suitable for the target. However, the XPS results showed that the ternary alloy catalyst with PDA coating prepared according to the present disclosure had a lower content of Ni. This is because, if Ni is more present in the core of the ternary alloy catalyst, the content of Ni on the surface is measured to be low, where XPS shows the component ratio on the surface of the ternary alloy catalyst. In addition, the XPS results of the ternary alloy catalyst with PDA coating according to the present disclosure showed that the content of Ru was also decreased. This is because during the heat treatment process, Ru also moves to the core of the ternary alloy catalyst. The ICP results after leaching showed that the content of Ni was decreased in all ternary alloy catalysts. However, for the ternary alloy catalyst with PDA coating prepared according to the present disclosure was applied, a relatively higher Ni was detected. This is because a core-shell structure was formed due to the PDA coating and Ni was protected by the Pt shell, such that the elution of Ni was decreased during the leaching process. It can be seen from the XPS results that the content of Ni was measured to be relatively lower in the ternary alloy catalyst heat treated after PDA coating. Accordingly, it can be seen that the core-shell structure in which Ni is concentrated inside the alloy catalyst is formed by the method for preparing the ternary alloy catalyst according to the present disclosure, thereby suppressing the leaching of Ni.

Test Example 4

In the present Test Example 4, a test was conducted to determine whether the surface segregation of ruthenium (Ru) occurred depending on whether polydopamine (PDA) coating was performed in the preparation of the ternary alloy catalyst.

Figure 5:
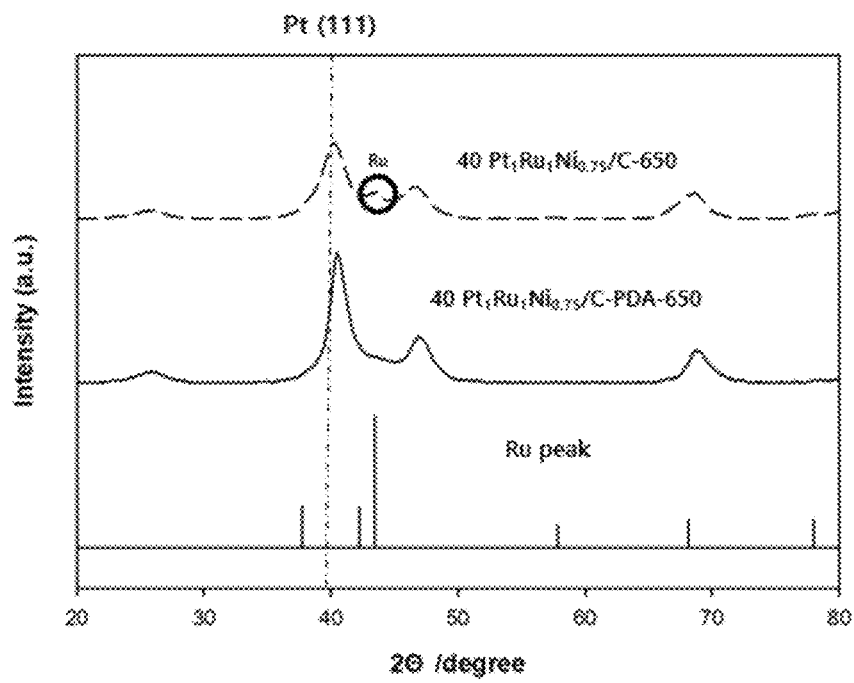
FIG. 5 shows X-ray diffraction (XRD) analysis patterns of the ternary alloy catalyst using polydopamine coating prepared according to the present disclosure and a ternary alloy catalyst prepared in the same manner without PDA coating.

FIG. 5 shows X-ray diffraction (XRD) analysis pattern images of the ternary alloy catalyst using the polydopamine coating prepared according to the present disclosure and a ternary alloy catalyst prepared in the same manner without the PDA coating. It can be seen from FIG. 5 that for the ternary alloy catalyst (40 $Pt_1Ru_1Ni_{0.75}$/C-PDA-650° C.) prepared by performing PDA coating, the Ru peak does not appear, whereas for the ternary alloy catalyst (40 $Pt_1Ru_1Ni_{0.75}$/C-650° C.) prepared without performing PDA coating, the Ru peak appears. This means that Ru remains on the surface of the ternary alloy catalyst without performing PDA coating during high-temperature heat treatment.

Test Example 5

In the present Test Example 5, a test was conducted to evaluate the resistance to carbon monoxide (CO) poisoning depending on whether polydopamine (PDA) coating was performed in the preparation of a ternary alloy catalyst.

Figure 6:
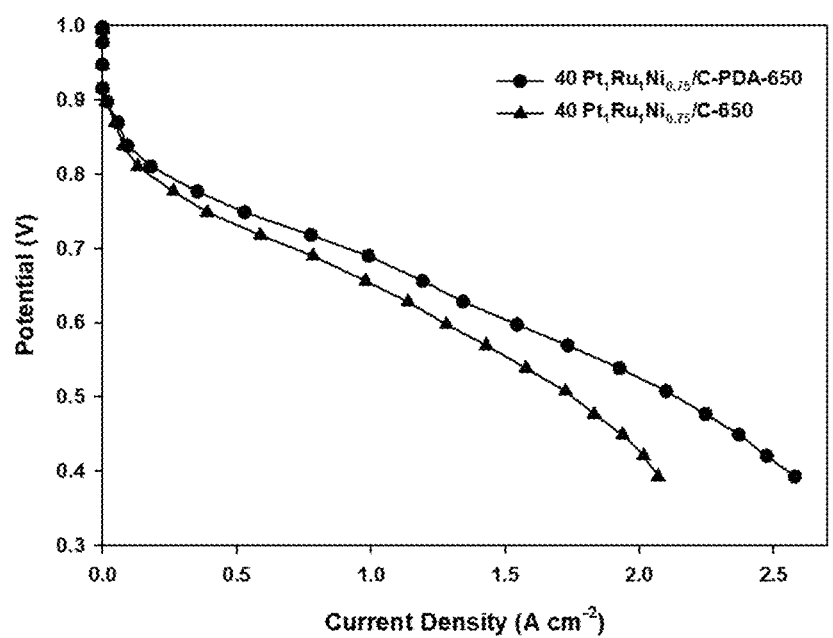
FIG. 6 shows comparison graphs in which resistances to CO poisoning of the ternary alloy catalyst using polydopamine coating prepared according to the present disclosure and the ternary alloy catalyst prepared in the same manner without performing PDA coating are evaluated through changes in potential and current density.

FIG. 6 shows comparison graphs in which the resistances to CO poisoning of the ternary alloy catalyst using the polydopamine coating prepared according to the present disclosure and the ternary alloy catalyst prepared in the same manner without performing PDA coating are evaluated through changes in potential and current density.

In order to evaluate the unit cell performance, an electrode that has used a commercial Pt/C catalyst (including 0.4 mg·cm$^{-2}$ of platinum) was manufactured as a cathode, and an electrode that has used a ternary alloy catalyst (40 $Pt_1Ru_1Ni_{0.75}$/C-PDA-650° C.) (including 0.4 mg·cm$^{-2}$ based on metal) prepared by performing PDA coating according to the present disclosure and a ternary alloy catalyst (40 $Pt_1Ru_1Ni_{0.75}$/C-650° C.) (including 0.4 mg·cm$^{-2}$ based on metal) prepared without performing PDA coating was manufactured as an anode. As the gas, 150 ccm of hydrogen were supplied to the anode and 150 ccm of oxygen was supplied to the cathode at atmospheric pressure, and an operating temperature of the unit cell was conducted at 80° C. to evaluate initial performance. Thereafter, hydrogen containing 10 ppm CO was flowed to the anode to evaluate the resistance to CO poisoning.

As illustrated in FIG. 6, as a result of measuring resistance to CO poisoning, the ternary alloy catalyst (40 $Pt_1Ru_1Ni_{0.75}$/C-PDA-650° C.) prepared by performing PDA coating according to the present disclosure showed the resistance to CO poisoning higher than that of the ternary alloy catalyst (40 $Pt_1Ru_1Ni_{0.75}$/C-650° C.) prepared without performing PDA coating. It was confirmed from FIG. 6 that the PDA coating suppressed sintering during heat treatment to prepare a ternary alloy catalyst having a small size, and Ni was moved into the core of the ternary alloy catalyst to prevent the elution of Ni under an acidic driving condition of the fuel cell, thereby showing excellent resistance to CO poisoning.

Test Example 6

In the present Test Example 6, a test was conducted to evaluate the characteristics of a ternary alloy catalyst depending on the heat treatment temperature in the preparation of a ternary alloy catalyst using the polydopamine (PDA) coating.

Figure 7:
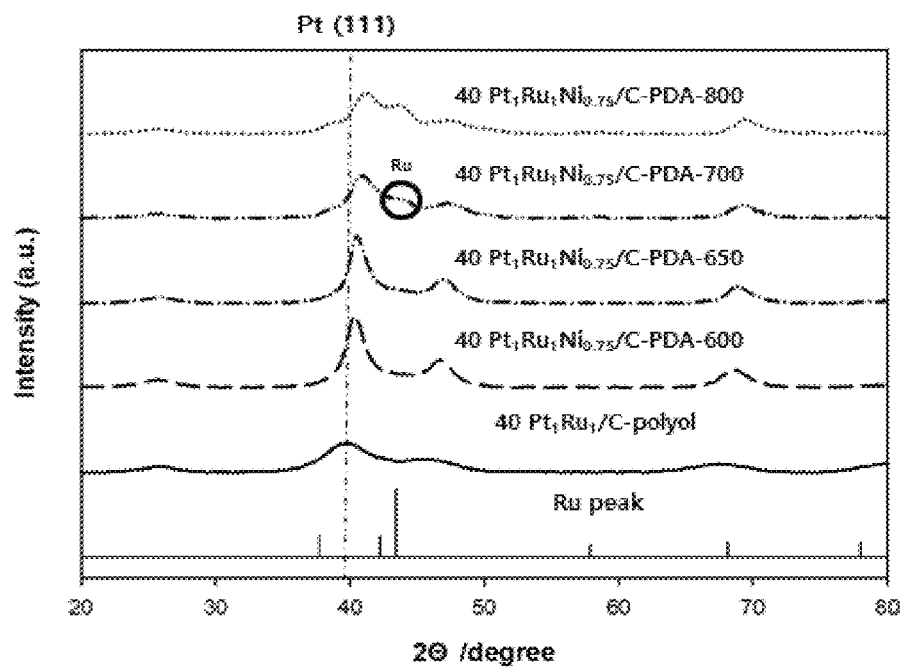
FIG. 7 shows XRD patterns of ternary alloy catalysts using polydopamine coating prepared at different heat treatment temperatures of 600° C., 650° C., 700° C., and 800° C.

FIG. 7 shows XRD patterns of ternary alloy catalysts using polydopamine coating prepared at different heat treatment temperatures of 600° C., 650° C., 700° C., and 800° C. In a precursor deposition method, the heat treatment temperature is one of the important factors determining the degree of alloying and particle size of the alloy catalyst. In general, the higher the heat treatment temperature, the higher the platinum concentration of the surface and the degree of alloying, such that the durability and activity of the catalyst is improved. However, increasing the heat treatment temperature decreases the active area of the catalyst due to an increase in the particle size and agglomeration of the particles of the catalyst.

It can be seen from FIG. 7 that from the XRD pattern image, the Ru peak appears when the heat treatment temperature is 700° C. or higher. This means that, ruthenium is segregated separately even though the PDA coating is performed at a high temperature of 700° C. or more.

The XRD particle size and degree of alloying of the ternary alloy catalysts using the polydopamine coating prepared at different heat treatment temperatures of 600° C., 650° C., 700° C., and 800° C. are shown in Table 2 below. The degree of alloying was determined through the degree of movement of the Pt (111) peak.

TABLE 2

| Catalyst | XRD analysis | |
|---|---|---|
| | (111) Peak position (°) | Particle size (nm) |
| 40 $Pt_1Ru_1$/C-polyol | 39.82 | 2.1 |
| 40 $Pt_1Ru_1Ni_{0.75}$/C-PDA-600° C. | 40.76 | 3.7 |
| 40 $Pt_1Ru_1Ni_{0.75}$/C-PDA-650° C. | 40.84 | 3.7 |
| 40 $Pt_1Ru_1Ni_{0.75}$/C-PDA-700° C. | 40.9 | 4.0 |
| 40 $Pt_1Ru_1Ni_{0.75}$/C-PDA-800° C. | 41.16 | 4.3 |

Compared with the XRD peak of the platinum catalyst supported on normal carbon, the more the peak moves to the right (the number increases), the higher the degree of alloying. It can be seen from Table 2 that the degree of alloying is 40.76, 40.84, 40.9 and 41.16° for the heat treatment temperatures of 600° C., 650° C., 700° C., and 800° C., respectively, which shows that the degree of alloying increases as the heat treatment temperature increases. This means that as the heat treatment temperature increased, the Ni atom affected the arrangement of the PtRu alloy, and thus the lattice spacing was decreased. The average particle sizes were calculated to have 3.7, 3.7, 4.0 and 4.3 nm, respectively, for the heat treatment temperatures of 600° C., 650° C., 700° C., and 800° C. These values mean that the particle size slightly increases as the temperature increases because the PDA coating layer does not fully suppress the sintering of particles during high-temperature heat treatment.

Test Example 7

In the present Test Example 7, a test was conducted to evaluate the resistance to carbon monoxide (CO) poisoning depending on the heat treatment temperature in the preparation of a ternary alloy catalyst using the polydopamine (PDA) coating.

Figure 8:
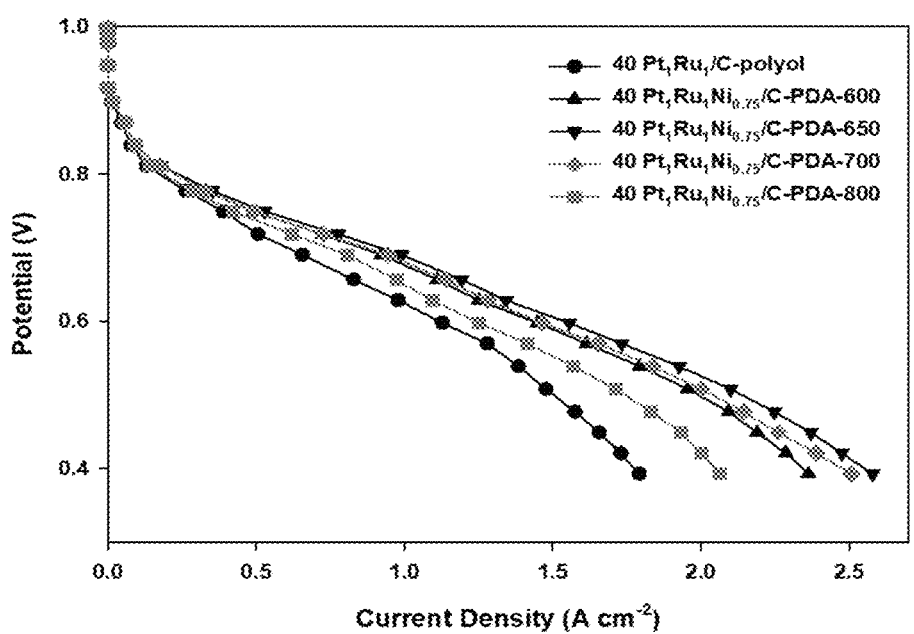
FIG. 8 shows comparison graphs in which resistances to CO poisoning of the ternary alloy catalysts prepared using polydopamine coating at different heat treatment temperatures of 600° C., 650° C., 700° C., and 800° C. are evaluated through changes in potential and current density.

FIG. 8 shows comparison graphs in which resistances to CO poisoning of the ternary alloy catalysts using polydopamine coating prepared at different heat treatment temperatures of 600° C., 650° C., 700° C., and 800° C. are evaluated through changes in potential and current density. In order to evaluate the unit cell performance, an electrode that has used a commercial Pt/C catalyst (including 0.4 mg·cm$^{-2}$ of platinum) was manufactured as a cathode, and an electrode that has used a ternary alloy catalyst (40 $Pt_1Ru_1Ni_{0.75}$/C-PDA-650° C.) (including 0.4 mg·cm$^{-2}$ based on metal) prepared by performing PDA coating according to the present disclosure and a ternary alloy catalyst (40 $Pt_1Ru_1Ni_{0.75}$/C-650° C.) (including 0.4 mg·cm$^{-2}$ based on metal) prepared without performing PDA coating was manufactured as an anode, by varying the heat treatment temperature. As the gas, 150 ccm of hydrogen were supplied to the anode and 150 ccm of oxygen was supplied to the cathode at atmospheric pressure, and an operating temperature of the unit cell was conducted at 80° C. to evaluate initial performance. Thereafter, hydrogen containing 10 ppm CO was flowed to the anode to evaluate the resistance to CO poisoning.

As illustrated in FIG. 8, as a result of measuring resistance to CO poisoning, the ternary alloy catalyst (40 $Pt_1Ru_1Ni_{0.75}$/C-PDA-650° C.) prepared by performing PDA coating according to the present disclosure showed the resistance to CO poisoning higher than that of the ternary alloy catalyst (40 $Pt_1Ru_1Ni_{0.75}$/C-650° C.) prepared without performing PDA coating, and the most excellent resistance to CO poisoning was shown when the heat treatment temperature was 650° C. It seems that this is because Ru was perfectly alloyed with Pt and Ni without a segregation peak of Ru at a heat treatment temperature of 650° C. when comparing the XRD pattern images of FIG. 7, and the ternary alloy catalyst shows excellent resistance to CO poisoning, as compared to the ternary alloy catalysts in which a separation peak of Ru appears at a heat treatment temperature of 700° C. or more. This is because Ru was not perfectly alloyed and Ru was agglomerated with each other, such that a surface area of Ru acting as a dual functions and ligand is reduced, and thus, resistance to CO poisoning is decreased.

Test Example 8

In the present Test Example 8, a test was conducted to evaluate the characteristics depending on the content of Ni in the preparation of a ternary alloy catalyst using the polydopamine (PDA) coating.

Figure 9:
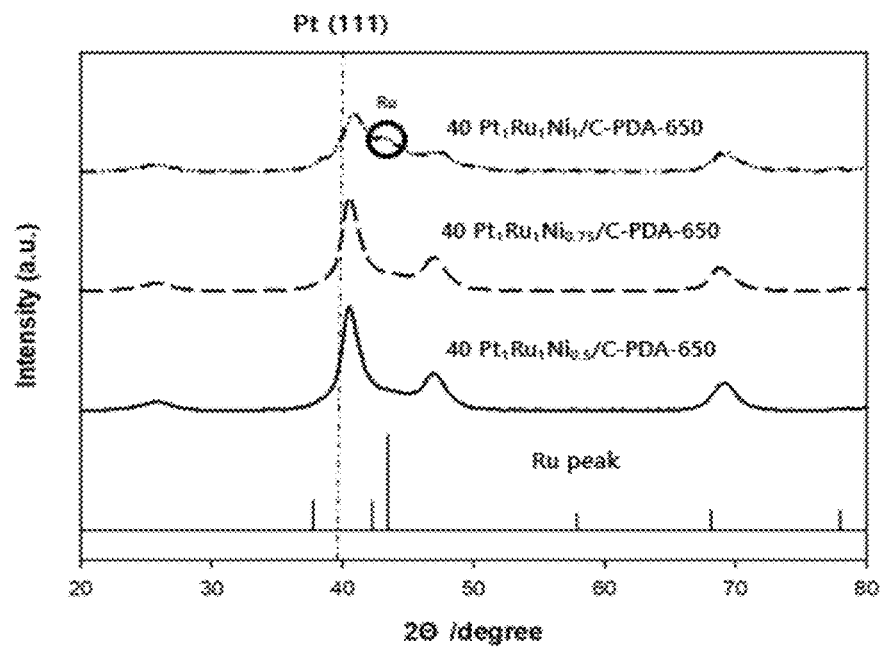
FIG. 9 shows XRD patterns of ternary alloy catalysts using polydopamine coating prepared by varying a content of Ni to 0.5, 0.75, and 1 (molar ratio to Pt and Ru) and performing heat treatment at 650° C.

FIG. 9 shows XRD patterns of ternary alloy catalysts using polydopamine coating prepared by varying a content of Ni to 0.5, 0.75, and 1 (molar ratio to Pt and Ru) and performing heat treatment at 650° C.

It can be seen from FIG. 9 that from the XRD pattern image, the Ru peak appears when the content of Ni was 1. It can be seen from FIG. 9 that if the content of Ni is greater than or equal to a certain ratio, Pt, Ru, and Ni were not perfectly alloyed and Ru was segregated. Table 3 below shows the XRD particle size and the degree of alloying of a ternary alloy catalyst using polydopamine coating prepared by varying the content of Ni to 0.5, 0.75 and 1 (molar ratio to Pt and Ru) and performing the heat treatment at 650° C. are shown in Table 3 below.

TABLE 3

| Catalyst | XRD analysis | |
|---|---|---|
| | (111) Peak position (°) | Particle size (nm) |
| 40 $Pt_1Ru_1Ni_{0.5}$/C-PDA-650° C. | 40.8 | 3.7 |
| 40 $Pt_1Ru_1Ni_{0.75}$/C-PDA-650° C. | 40.84 | 3.7 |
| 40 $Pt_1Ru_1Ni_1$/C-PDA-650° C. | 41.1 | 3.9 |

As a result of XRD analysis, as the content of Ni t increased, the degree of alloying of the ternary alloy catalyst increased, and average particle sizes of the ternary alloy catalysts prepared by varying the content of Ni to 0.5, 0.75, and 0.1 (molar ratio to Pt and Ru) were calculated as 3.7, 3.7, and 3.9 nm, respectively. This means that as the content of Ni increased, the degree of alloying increased, but the content of content of Ni did not affect the particle size.

Test Example 9

In the present Test Example 9, a test was conducted to evaluate the resistance to carbon monoxide (CO) poisoning depending on the content of Ni in the preparation of a ternary alloy catalyst using the polydopamine (PDA) coating.

Figure 10:
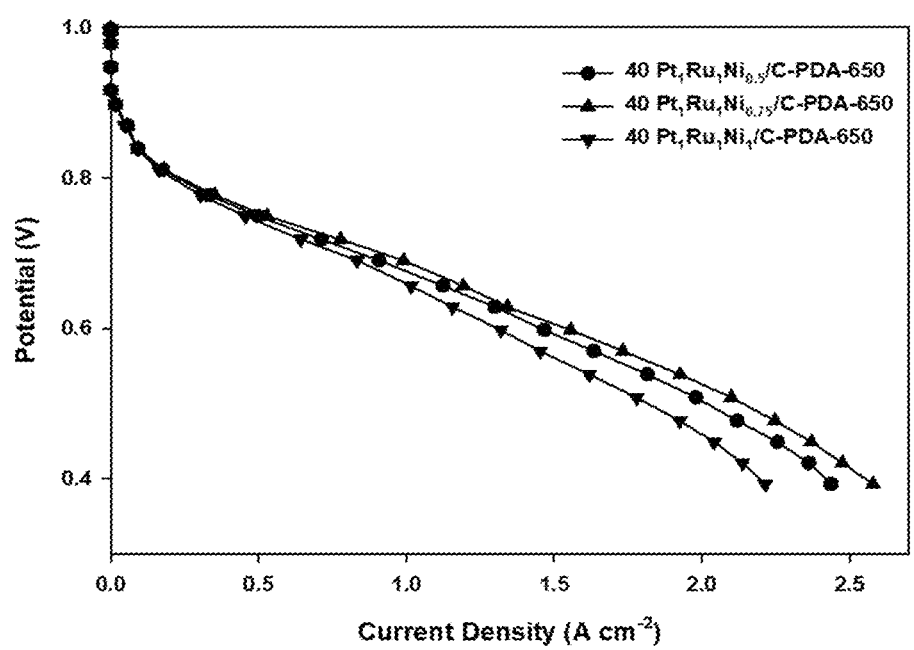
FIG. 10 shows comparison graphs in which resistances to CO poisoning of ternary alloy catalysts prepared using polydopamine coating by varying a content of Ni to 0.5, 0.75, and 0.1 (molar ratio to Pt and Ru) are evaluated through changes in potential and current density.

FIG. 10 shows comparison graphs in which resistances to CO poisoning of ternary alloy catalysts using polydopamine coating prepared by varying a content of Ni to 0.5, 0.75, and 0.1 (molar ratio to Pt and Ru) are evaluated through changes in potential and current density. In order to evaluate the unit cell performance, an electrode that has used a commercial Pt/C catalyst (including 0.4 mg·cm² of platinum) was manufactured as a cathode, and an electrode that has used a ternary alloy catalyst (40 $Pt_1Ru_1Ni_{0.75}$/C-PDA-650° C.) (including 0.4 mg·cm$^{-2}$ based on metal) prepared by performing PDA coating according to the present disclosure was manufactured as an anode, by varying the content of Ni. As the gas, 150 ccm of hydrogen were supplied to the anode and 150 ccm of oxygen was supplied to the cathode at atmospheric pressure, and an operating temperature of the unit cell was conducted at 80° C. to evaluate initial performance. Thereafter, hydrogen containing 10 ppm CO was flowed to the anode to evaluate the resistance to CO poisoning.

As illustrated in FIG. 10, as a result of measuring resistance to CO poisoning, when the content of Ni was 0.75, it showed the most excellent resistance to CO poisoning. It can be seen from the results of Test Example 9 and the results of Test Examples 5 and 7 that at a heat treatment temperature of 650° C. and a molar ratio of Pt:Ru:Ni=1:1:0.75, the ternary alloy catalyst is perfectly alloyed and shows the most excellent resistance to CO poisoning due to a synergistic effect of the optimal bifunction and ligand mechanism.

Test Example 10

In the present Test Example 10, the catalytic performances of a commercial Pt/C catalyst and a ternary alloy catalyst using polydopamine (PDA) coating prepared according to the present disclosure were compared.

Figure 11:
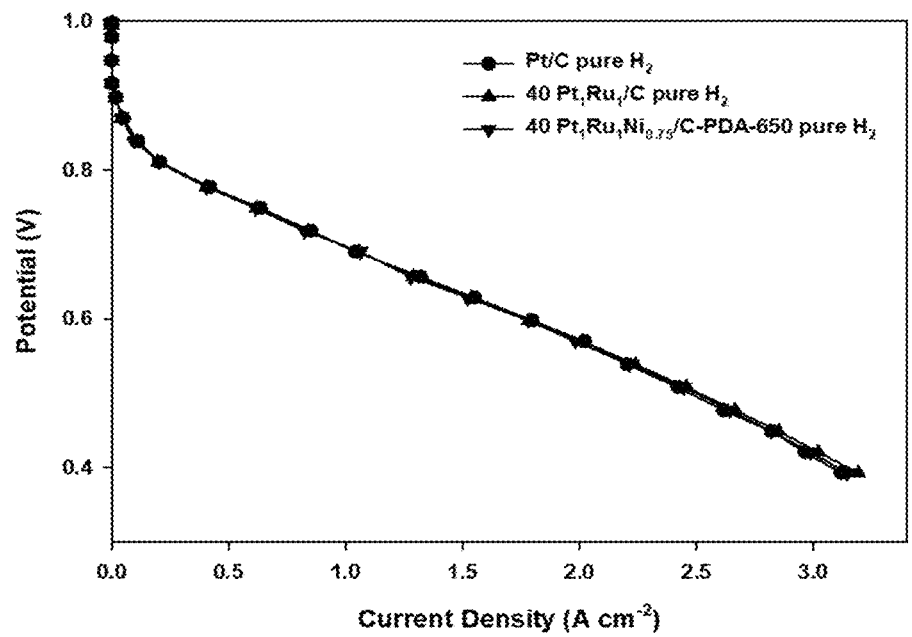
FIG. 11 shows comparison graphs in which catalytic performances of commercial TKK Pt/C, a catalyst ($Pt_1Ru_1$-polyol) prepared by a polyol method without performing heat treatment, and a ternary alloy (Pt$_1$Ru$_1$Ni$_{0.75}$/C-PDA-650) catalyst prepared by using PDA as a capping agent, applying a precursor deposition method, and then performing heat treatment at 650° C. according to the present disclosure are evaluated through changes in potential and current density.

FIG. 11 shows comparison graphs in which catalytic performances of commercial TKK Pt/C, a catalyst ($Pt_1Ru_1$-polyol) prepared by a polyol method without performing heat treatment, and a ternary alloy ($Pt_1Ru_1Ni_{0.75}$/C-PDA-650) catalyst prepared by using PDA as a capping agent, applying a precursor deposition method, and then performing heat treatment at 650° C. according to the present disclosure are manufactured as an anode.

In order to evaluate the unit cell performance, an electrode that has used a commercial Pt/C catalyst (including 0.4 mg·cm$^{-2}$ of platinum) was manufactured as a cathode. As the gas, 150 ccm of hydrogen were supplied to the anode and 150 ccm of oxygen was supplied to the cathode at atmospheric pressure, and an operating temperature of the unit cell was conducted at 80° C. to evaluate initial performance. Thereafter, hydrogen containing 10 ppm CO was flowed to the anode to evaluate the resistance to CO poisoning. As illustrated in FIG. 11, when pure hydrogen was flowed to the anode, the same performance was obtained in all membrane electrode assemblies (MEA).

Test Example 11

In the present Test Example 11, a test was conducted to evaluate the resistance to carbon monoxide (CO) poisoning of a commercial Pt/C catalyst and a ternary alloy catalyst using polydopamine (PDA) coating prepared according to the present disclosure.

Figure 12:
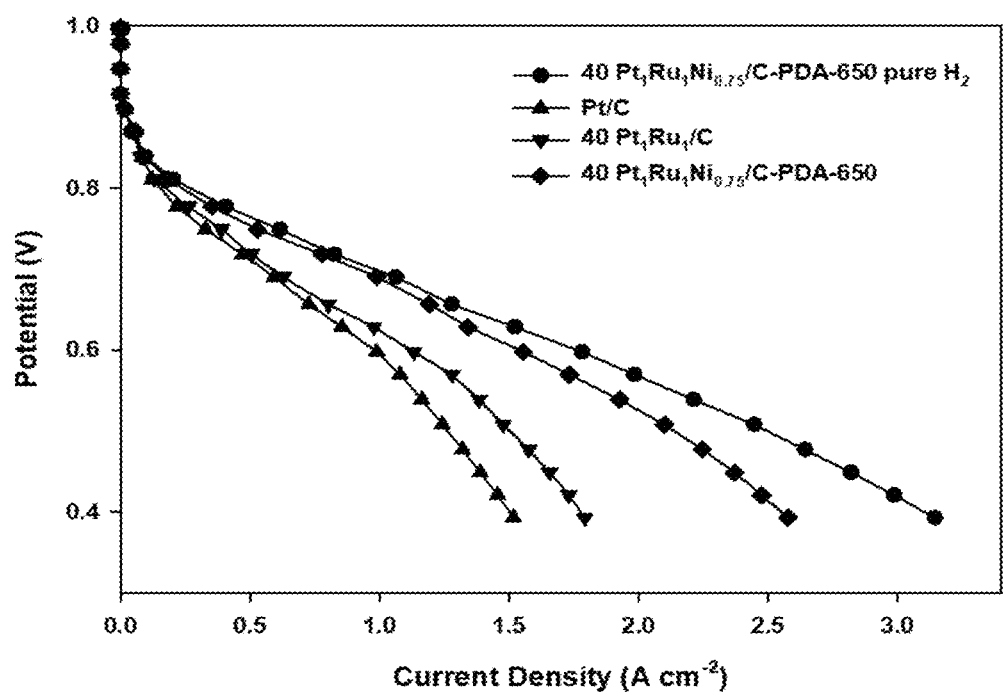
FIG. 12 shows comparison graphs in which resistances to CO poisoning of a commercial Pt/C catalyst and the ternary alloy catalyst using PDA coating prepared according to the present disclosure are evaluated through changes in potential and current density.

FIG. 12 shows comparison graphs in which resistances to CO poisoning of a commercial Pt/C catalyst and the ternary alloy catalyst using polydopamine (PDA) coating prepared according to the present disclosure are evaluated through changes in potential and current density. After measuring the initial MEA performance with pure hydrogen, hydrogen gas containing 10 ppm CO was flowed. The Pt/C catalyst showed the greatest decrease in performance because CO strongly adsorbed to platinum and caused poisoning. The PtRu catalyst prepared by the polyol method showed a high resistance to CO poisoning compared to Pt/C due to the effect of Ru. The ternary alloy catalyst ($Pt_1Ru_1Ni_{0.75}$/C-PDA-650) prepared according to the present disclosure showed very good resistance to CO poisoning compared to the PtRu catalyst ($Pt_1Ru_1$-polyol) prepared by the single Pt/C and polyol method.

Test Example 12

In the present Test Example 12, a test was conducted to evaluate the long-term resistance to carbon monoxide (CO) poisoning of the ternary alloy catalyst using polydopamine (PDA) coating prepared according to the present disclosure.

Figure 13:
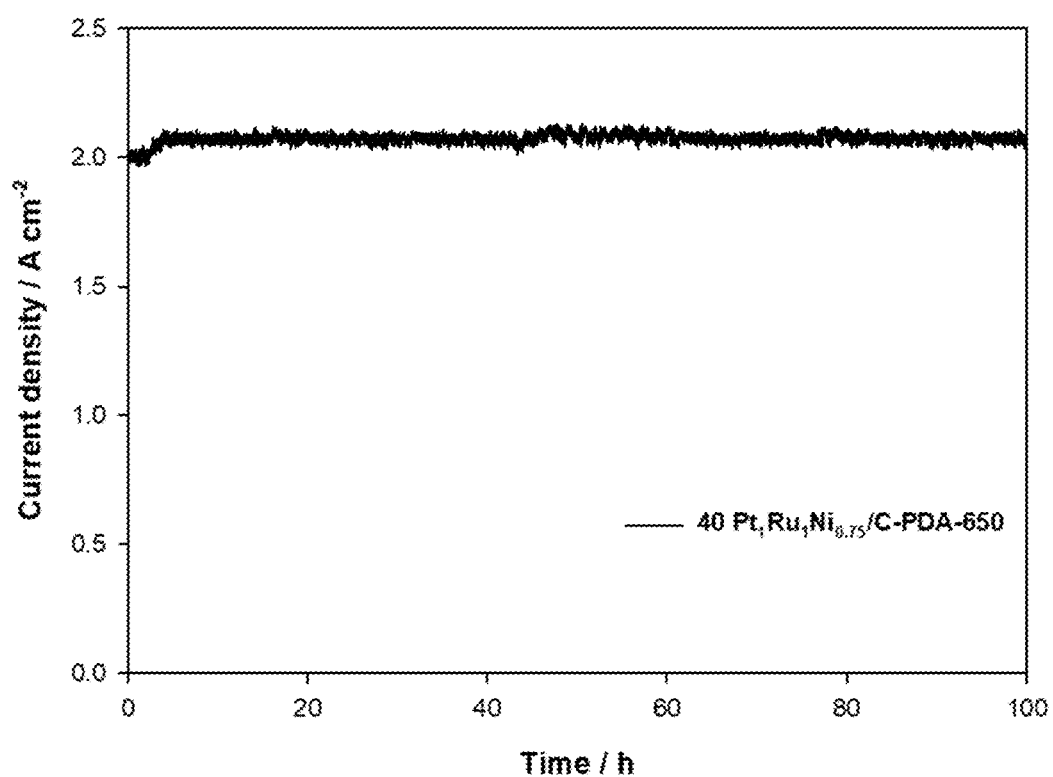
FIG. 13 shows a graph in which resistance to CO poisoning of the ternary alloy catalyst using PDA coating prepared according to the present disclosure for 100 hours is evaluated through a change in current density with time at a constant voltage of 0.5V.

FIG. 13 shows a graph in which the resistance to CO poisoning of a ternary alloy catalyst using PDA coating prepared according to the present disclosure for 100 hours is evaluated through a change in current density according to the potential. In order to evaluate the unit cell performance, an electrode that has used a commercial Pt/C catalyst (including 0.4 mg·cm$^{-2}$ of platinum) was manufactured as a cathode, and an electrode that has used a ternary alloy catalyst (40 $Pt_1Ru_1Ni_{0.75}$/C-PDA-650° C.) (including 0.4 mg·cm$^{-2}$ based on metal) prepared by performing PDA coating according to the present disclosure was manufactured as an anode. As the gas, 150 ccm of hydrogen were supplied to the anode and 150 ccm of oxygen was supplied to the cathode at atmospheric pressure, and an operating temperature of the unit cell was conducted at 80° C. to evaluate initial performance. Thereafter, hydrogen containing 10 ppm CO was flowed to the anode to evaluate stability at a constant voltage of 0.5V for 100 hours. As a result, as illustrated in FIG. 13, the ternary alloy catalyst (40 $Pt_1Ru_1Ni_{0.75}$/C-PDA-650° C.) prepared by performing PDA coating according to the present disclosure stably showed a constant current density for 100 hours.

The method for preparing a ternary alloy catalyst according to the present disclosure may prepare a ternary alloy catalyst with increased resistance to carbon monoxide (CO) poisoning in which polydopamine is utilized as a coating material for a ternary alloy catalyst having a core-shell structure containing platinum to suppress the growth of particles during subsequent high-temperature heat treatment, and nickel (Ni), which is a transition metal, is diffused inside to form a core, thereby effectively preventing elution of nickel under an acidic condition.

The description of the present disclosure stated above is for illustration, and it will be understood by those of ordinary skill in the art to which the present disclosure pertains that the present disclosure may be easily modified into other specific forms without changing the technical spirit or essential features of the present disclosure. Therefore, it is to be understood that the embodiments described above are illustrative rather than being restrictive in all aspects.

What is claimed is:

1. A method for preparing a ternary alloy catalyst using polydopamine coating, the method comprising:

supporting a PtRu catalyst on crystalline carbon (C);
coating a surface of the supported PtRu catalyst with polydopamine (PDA);
preparing a PtRuNi catalyst supported on carbon by supporting Ni on the coated PtRu catalyst supported on carbon; and
performing heat treatment on the PtRuNi catalyst in a mixed gas atmosphere of hydrogen and inert gas,
wherein in the mixed gas atmosphere of the hydrogen and the inert gas, the hydrogen and the inert gas are mixed with each other in a volume ratio of 10:30 to 50.

2. The method of claim 1, wherein the crystalline carbon is one or more selected from the group consisting of carbon black, carbon nanotubes, carbon nanofibers, carbon nanocoils, and carbon nanocages.

3. The method of claim 1, wherein the carbon is carbon doped with 1-pyrene carboxylic acid (1-PCA).

4. The method of claim 1, wherein a molar ratio of Pt:Ru in the PtRu catalyst is 1:0.9 to 1.1.

5. The method of claim 1, wherein a molar ratio of Pt:Ru:Ni in the PtRuNi catalyst is 1:0.9 to 1.1:1.

6. The method of claim 1, wherein the heat treatment is performed at 600 to 700° C.

7. The method of claim 1, wherein the inert gas is argon (Ar).

8. A ternary alloy catalyst prepared by the method of claim 1 using polydopamine coating.

9. An anode active material for a fuel cell, comprising the ternary alloy catalyst of claim 8.

* * * * *